Sept. 7, 1948.　　　　A. F. FIBIGER　　　　2,448,523
FISH LURE
Filed Nov. 28, 1945

Inventor
Augustus F. Fibiger
By
Attorney

Patented Sept. 7, 1948

2,448,523

UNITED STATES PATENT OFFICE 2,448,523

FISH LURE

Augustus F. Fibiger, Toledo, Ohio

Application November 28, 1945, Serial No. 631,443

1 Claim. (Cl. 43—43)

1

This invention relates to promotion of angling effectiveness for line carried hooks to engage fish.

This invention has utility when incorporated in an artificial bait device including a carrier float having appended thereto fish ensnaring hooks, and a relatively movable wobbling or flapping insect, preferably above or in proximity to the surface of the water and powered for relative movement as to the carrier by the relative water flow past the carrier.

Referring to the drawings.

Figure 1:
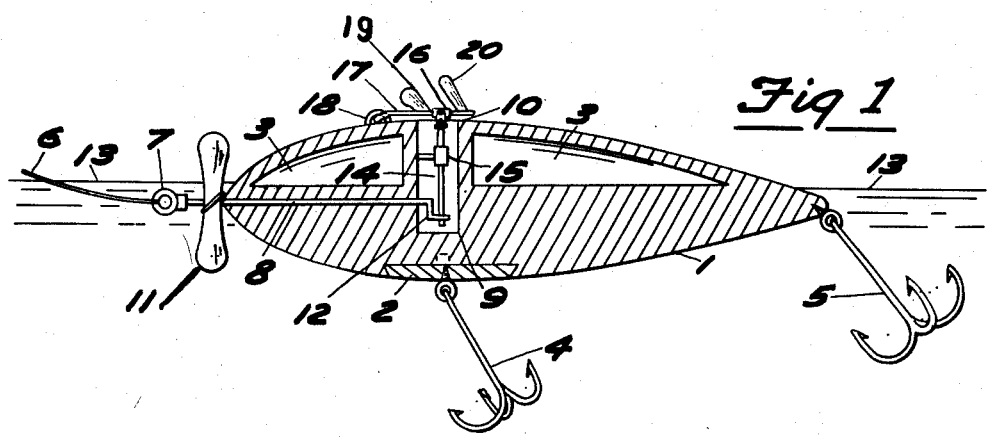
Fig. 1 is a longitudinal vertical section thru an embodiment of the invention in normal draft position.
Figure 2:
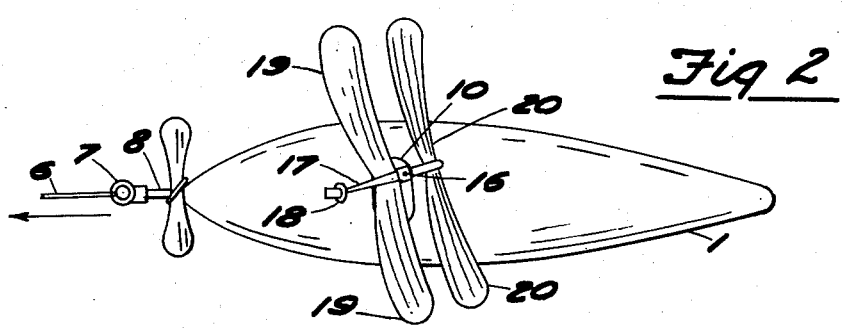
Fig. 2 is a plan view of the device of Fig. 1, the hooks not shown.
Figure 3:
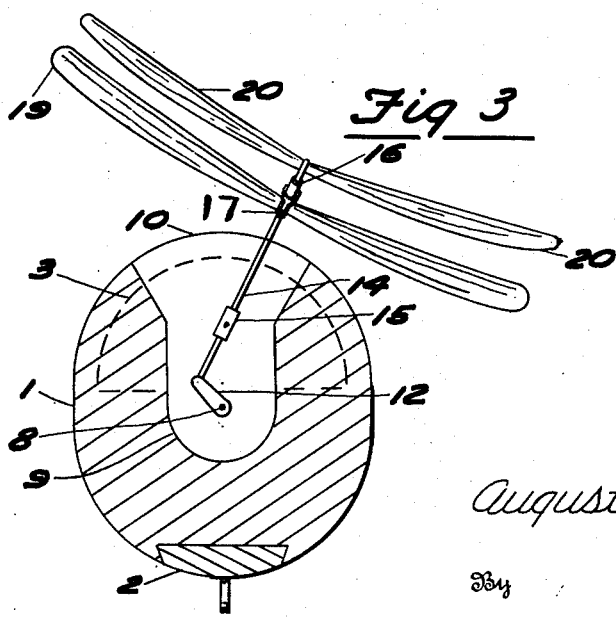
Fig. 3 is a vertical transverse section thru the carrier at the well, and omitting the hooks, showing the insect simulating wobbler connection.

A carrier 1 of general float design has a main body which may generally simulate a minnow in contour. Along a lower side or bottom thereof a sinker portion or weight 2 is incorporated therewith, while the upper portion of the body 1 includes a chamber 3. The carrier may be formed from a substance of light specific gravity such as a plastic, and may be attractively decorated. A plural snag or ensnaring hook 4 may be swingably mounted with the carrier 1 in the region of the weight 2. An additional multiple hook device 5 may be swingable from the aft or tail region of the carrier 1. The hook devices 4, 5, are anchored to the body by means of screw eyes.

The angler's fish line 6 may have a loose connection 7 with a horizontally extending shaft 8 axially of, and free to turn in, the carrier 1. The shaft 8 extends from the forward or nose region of the carrier to a central well or chamber 9 having an open top 10.

Fixed on the shaft 8 just forward of the nose of the carrier 1 and aft of the connection 7, is a radial blade water wheel 11. The shaft 8 in the well 9 has fixed therewith a crank 12. The carrier or float 1 normally rides in water 13 in such a manner that the open top of the well is upward. Whether in a current of water 13, or by trolling, the relative movement of the water to the carrier 1, effects rotation of the water turbine 11, and with it the shaft 8 and its crank 12.

Mounted on the crank 12 is an upwardly extending rigid fine wire lever 14 passing thru a slide guide 15 fixed in the well 9. The guide 15 thus serves as a fulcrum thru which the lever 14 passes to a universal connection 16 with an arm

2

17 having a pivotal connection 18 with the top of the carrier 1 forward of the opening 10.

Preferably fixedly mounted on the arm 17 may be differently spaced pairs 19, 20, of insect wing elements, said wings being spaced on opposite sides of the connection 18 and at different angular relations to the arm 17.

It is thus seen that rotation of the water wheel 11, is transmitted thru the floating lever 14, to lift and swing the arm 17 from side to side of the body 1. This lifting and crosswise swinging of the arm 17, develops a wobble or fluttering-like action in the wing elements 19, 20. This movement occurs near or partly out of the water. The motion of the carrier 1 thru the water, to some extent, tends to submerge or spray water on the wing devices 19, 20, which in their tilting, tend to skim the water. There is thus light rays glittering on these wings as further fish enticement to charge the insect as a prey. Such vicious thrusts of the fish toward the insect wings 19, 20, do not take into account avoidance of the carrier 1 nor more particularly the hooks 4, 5, and there is reward for the angler.

In angling practice, the dimension of the hooks 4, 5, takes into account the size and character of the fish which it is sought to catch. Likewise, there may be variation in the size and character of the float.

While a range of solid or color combinations may be adopted, the experience of applicant is that fish are induced to charge the lure by what is happening at the water surface. This is especially true when there are slight disturbances of the water surface, such as those caused by an insect settling thereon, or more particularly struggling against so settling. There is thus importance to the fish for immediate attack to procure the insect as prey before its strivings may accomplish ascent and thereby permit it to escape from the possibility of becoming food for the fish.

During draft of the fish line 6, whether to hold the float or carrier body 1 in a flowing stream of water, or to tow it thru water otherwise quiescent, the water motor is effective to lift and lower the arm 17 about the pivotal connection 18. This lifting and lowering is incidental to the more enticing effectiveness of the side to side swinging of the wing tip ends to strike the water with slight splashes thereby. The fish inducement to attack is thereby most pronouncedly evident. Accordingly, the wobble action contributes materially to the advantages of the fish lure herein.

What is claimed and it is desired to secure by Letters Patent is:

A fish lure body adapted to respond to line draft for less than full submergence in water, a crank shaft extending forwardly from a mid-portion of the body, a line-draft connection to the shaft forwardly of the body, a water wheel fixed to the shaft aft of the connection and forwardly of the body, said body having an upwardly open well from its mid-portion in which well the crank of the shaft is located, a slide guide in the well disposed upwardly from the shaft, a lever pivotally connected to the crank and extending upwardly thru the guide to protrude above the well open top, an eye on the body top forwardly of the well, an arm connected to the eye and to the protruding portion of the lever whereby the arm will respond to the crank rotation by up and down and side sway combined movements, pairs of wing strips fixed to the arm for approximating water dip for the free end tips thereof in flutter-like movements relatively to the body from the arm operations, and a plurality of fish-ensnaring hooks swingably mounted on the body in intercepting direction of fish ascent toward attacking the wing flutter action of the strips.

AUGUSTUS F. FIBIGER.

REFERENCES CITED

The following references are of record in the file of this patent:

UNITED STATES PATENTS

| Number | Name | Date |
|---|---|---|
| 538,007 | Adam | Apr. 23, 1895 |
| 1,762,914 | Cornelius | June 10, 1930 |